Figure 1:
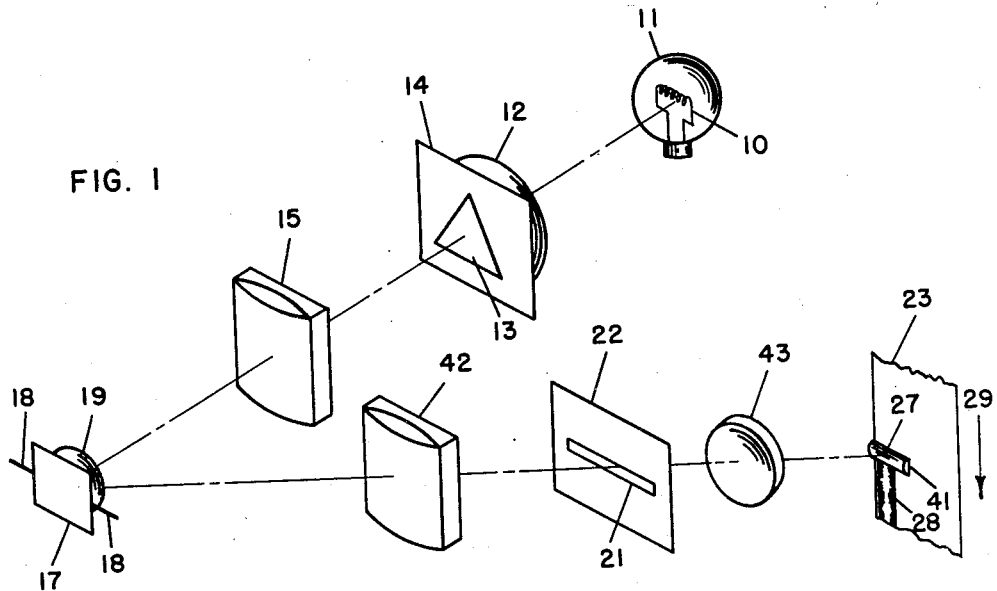

Feb. 21, 1950          J. A. MAURER, JR          2,497,953
IMPULSE RECORDING OPTICAL SYSTEM

Original Filed Aug. 2, 1940          2 Sheets-Sheet 1

INVENTOR:
JOHN A. MAURER, JR.
BY *Otto J. Nathansohn*
AGENT

Feb. 21, 1950        J. A. MAURER, JR        2,497,953
IMPULSE RECORDING OPTICAL SYSTEM
Original Filed Aug. 2, 1940        2 Sheets–Sheet 2
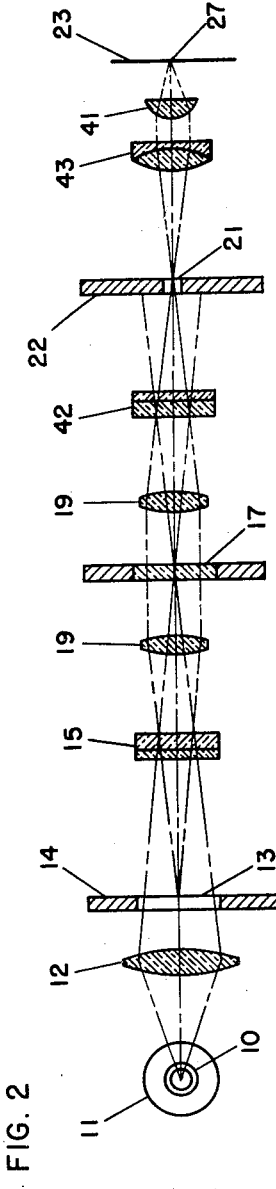
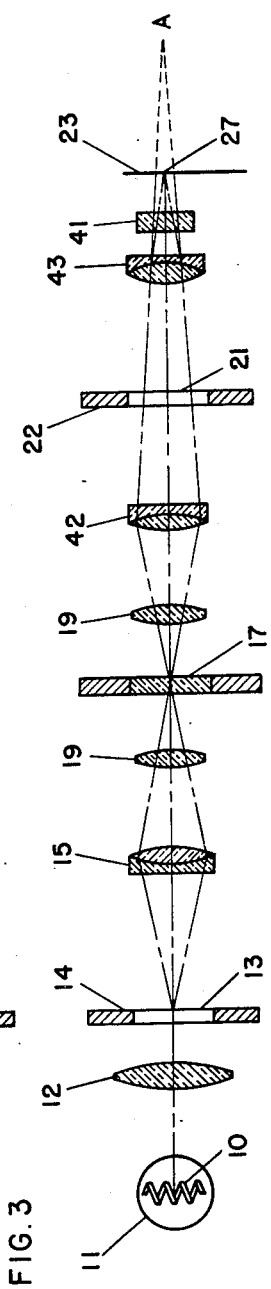
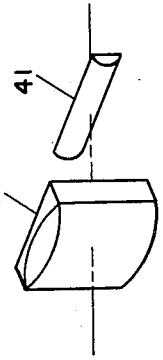
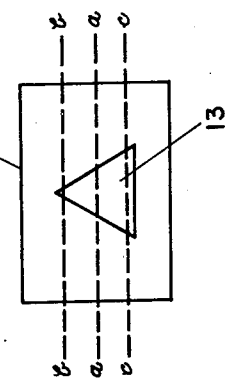
INVENTOR:
JOHN A. MAURER, JR.
BY *Otto J. Nathanson*
AGENT Patented Feb. 21, 1950

2,497,953

UNITED STATES PATENT OFFICE 2,497,953

IMPULSE RECORDING OPTICAL SYSTEM

John A. Maurer, Jr., New York, N. Y., assignor to J. A. Maurer, Inc., Long Island City, N. Y., a corporation of New York Application November 21, 1944, Serial No. 564,453, which is a division of application Serial No. 349,515, August 2, 1940, now Patent No. 2,437,470, dated March 9, 1948. Divided and this application July 24, 1947, Serial No. 763,193

4 Claims. (Cl. 88—24)

This invention relates to optical systems for the photographic recording of electrical impulses on a moving film such as are used in sound recording, picture transmission, and the like, and this application is a division of my application Serial No. 564,453, filed November 21, 1944, as a division of my application Serial No. 349,515, filed August 2, 1940; applications Serial No. 349,515 and Serial No. 564,453 being also assigned to J. A. Maurer, Inc., a corporation of New York, application Serial No. 349,515 now being abandoned, and application Serial No. 564,453 now being Patent No. 2,437,470, granted March 9, 1948.

More particularly, the invention relates to optical systems of the class referred to above wherein a small mirror vibrated by an oscillograph galvanometer, or a similar device for translating electrical impulses into mechanical vibrations, modulates a light beam in accordance with the electrical impulses to be recorded. The mirror oscillograph recording optical systems known heretofore, however, have the disadvantage that the light flux from the recording light source, such as the filament of an incandescent lamp, is not efficiently utilized therein. This unfavorable condition is due to the fact that the aperture of the oscillograph mirror is the limiting aperture in the two co-ordinate planes of the known optical systems, and that it cannot be enlarged beyond a certain degree since the physical size of the mirror must be comparatively small in order to avoid distortions due to its mass. For a given light source, therefore, the amount of light flux reaching the moving film is unduly limited in those optical systems, and this limitation makes itself particularly felt when filters are used at some position in the optical system, for example, for selecting light rays of a certain wave length, or for other purposes.

Another drawback of the known mirror oscillograph recording optical systems is that a portion of the light flux from the recording light source is not effectively prevented therein from falling on parts other than the oscillograph mirror, or on the structure housing the optical system. This portion of the light flux is to some extent reflected diffusely, thus forming stray light even though the surfaces on which it is incident may be black. Such stray light is objectionable because it may cause an additional exposure of the moving film, which should be exposed only to light flux modulated by the oscillograph mirror.

It is, therefore, an object of the present invention to provide a mirror oscillograph recording optical system which is highly efficient as regards the utilization of the light flux from the recording light source.

Another object of the invention is the provision of such an optical system whose limiting aperture can, in one of its co-ordinate planes, be made much larger than the aperture of the oscillograph mirror.

Another object of the invention is the provision of such an optical system wherein the formation of stray light is reduced to a negligible amount.

Another object of the invention is the provision of such an optical system which is particularly satisfactory as regards ease of manufacture and convenience of adjustment.

More specifically, however, it is an object of the invention to provide a mirror oscillograph recording optical system which embodies the features recited above, and which may be built at materially reduced cost.

A further object of the invention is the provision of such an optical system which may be built with small physical size and great compactness.

Still other objects of the invention include those which are hereinafter stated or apparent, or which are incidental to the invention.

In the optical system according to the invention, the oscillograph mirror is adapted to vibrate about a horizontal axis while the film moves past the recording point in a substantially vertical direction, the recording point being the point at which the optical axis of the system strikes the film. The optical system also has means for forming a uniformly illuminated light spot whose horizontal extension varies in a vertical direction. Further means are provided in the optical system which effect an imagery of this light spot in such a manner that it is conjugate to the recording point in both the vertical and horizontal planes of the optical system. Otherwise, however, the imagery of the light spot is different in the two co-ordinate planes. In the vertical plane, the light spot is first imaged at a horizontal slit by imaging means acting in the vertical plane and then at the recording point by imaging means acting in only the vertical plane, the horizontal slit being placed between the oscillograph mirror and the recording point. In the horizontal plane, on the other hand, an intermediate image of the light spot is formed substantially on the mirror by first imaging means which act in only the horizontal plane. The intermediate image, in its turn, is imaged at a position beyond the recording point by second imaging means which act in only the horizontal plane, and re-imaged at the recording point by third imaging means which act in the horizontal plane. By virtue of this arrangement, the mirror is substantially at a common focus of two imaging means which act in only the plane containing its axis of vibration, and the limiting aperture in the horizontal plane is the apparent aperture—as seen from the recording point—of the second imaging means. The apparent aperture of the second imaging means, however, can easily be made at least ten times as large as the aperture of the oscillograph mirror.

The means for forming the light spot, furthermore, include a recording light source and a screen with an opening. The opening is uniformly illuminated by light flux from the light source, and its intermediate image is formed substantially on the oscillograph mirror as has been explained hereinabove. At the same time, an image of the light source is formed substantially on the mirror by the action of a condenser lens in the vertical plane. In this manner, substantially all the light flux entering the optical system through the opening is controlled by the oscillograph mirror whereby the formation of stray light is reduced to a negligible amount.

The cost of building the optical system according to the invention, finally, may be materially reduced by substituting for the above mentioned first and second imaging means a single imaging means which likewise acts in only the horizontal plane. To that end, the light beam proceeding through the optical system is made to strike the oscillograph mirror at an angle which is so small that the single imaging means can be traversed by both the incident and reflected parts of the light beam. The single imaging means then forms the intermediate image of the light spot substantially on the mirror and, simultaneously, images the intermediate image at the position beyond the recording point. The angle at which the light beam strikes the mirror, is made sufficiently small preferably by folding the incident part of the light beam whereby, at the same time, a very compact mechanical structure is obtained for the optical system.

In the foregoing brief explanation of the state of the art and summary of the invention, and throughout the present specification, the term "co-ordinate planes" designates two planes at right angles to each other whose line of intersection is the optical axis of the system. The horizontal plane is the co-ordinate plane which contains the axis of the oscillograph mirror and the slit, while the vertical plane is the co-ordinate plane at right angles to the horizontal plane. The plane of the slit, finally, is the plane which contains the slit, and is at right angles to both the vertical and horizontal planes.

In the present specification, the terms "vertical" and "horizontal" thus are not used in any absolute sense but merely in order to distinguish between two planes, or directions, at right angles to one another, and choice between these terms has been determined solely by convenience in description and illustration.

The invention will be better understood when the following description is considered with the accompanying drawings of certain presently preferred embodiments thereof, and its scope will be pointed out in the appended claims.

In the drawings:

Fig. 1 is a diagrammatic perspective view of an optical system embodying the invention, Fig. 2 is a diagrammatic longitudinal section in the vertical plane of the optical system shown in Fig. 1, the optical axis being represented as a straight line and an oscillograph mirror as an aperture, Fig. 3 is a corresponding section in the horizontal plane, Fig. 4 is an elevation of a part of the optical system of Figs. 1 to 3, Fig. 5 is a diagrammatic longitudinal section in the vertical plane of a modification in which two cylindrical lenses shown in Figs. 1 to 3 have been replaced by a single cylindrical lens, and Fig. 6 is a perspective view of a modification of a part shown in Figs. 1 to 3 and 5.

Referring first to Figs. 1 to 3, these figures show, by way of example, a variable area recording optical system which embodies the invention. The optical system has a light source such as the filament 10 of an incandescent lamp 11. The light flux from lamp filament 10 uniformly illuminates a triangular opening 13 in a screen 14 so that a uniformly illuminated triangular light spot is formed at screen 14. The light beam defined by lamp filament 10 and opening 13 proceeds through the optical system and is deflected by the mirror 17 of an oscillograph galvanometer (not shown) or similar device for translating electrical impulses into mechanical vibrations. It thus has a part which is incident from opening 13 upon mirror 17, and a part which is reflected from mirror 17 towards the recording point 27. Recording point 27 is the point at which the optical axis of the system strikes the film 28, and film 28 moves past recording point 27 in a substantially vertical direction as indicated by the arrow 29.

More particularly, opening 13 is an isosceles triangle whose base extends horizontally, and mirror 17 is adapted to vibrate about an axis 18—18 which likewise extends horizontally. Furthermore, a horizontal slit 21 is formed in a screen 22 which is placed between mirror 17 and recording point 27.

A spherical condenser lens 12 is placed between lamp 11 and screen 14, and a cylindrical lens 15 which has its cylinder axis vertical, is placed between screen 14 and mirror 17. In front of mirror 17 there is placed a second spherical lens 19 which acts on the reflected as well as the incident part of the light beam proceeding through the optical system. A second cylindrical lens 42 which also has its cylinder axis vertical, is placed between mirror 17 and screen 22, while between screen 22 and recording point 27 there is placed a third spherical lens 43. Between spherical lens 43 and recording point 27, finally, there is placed a third cylindrical lens 44 which has its cylinder axis horizontal.

These six imaging means have focal lengths relative to the other parts of the optical system as follows (see Figs. 2 and 3):

Spherical lens 12 has one of its conjugate foci at lamp filament 10, and the other substantially at mirror 17, that is, either on mirror 17 or at a position close thereto. Cylindrical lens 15 has one of its conjugate foci at opening 13, and the other substantially at mirror 17 so that an intermediate image of opening 13 is formed substantially on mirror 17. Spherical lens 19 has one of its conjugate foci at opening 13, and the other at slit 21. Cylindrical lens 42 has one of its conjugate foci at the intermediate image of opening 13, and the other at a position A beyond recording point 27. Spherical lens 43 has one of its conjugate foci at position A, and the other at recording point 27. Cylindrical lens 41, finally, has one of its conjugate foci at slit 21, and the other at recording point 27.

By virtue of the arrangement described hereinabove of its various parts, the following imagery is performed in the optical system of Figs. 1 to 3:

In the vertical plane (Fig. 2), spherical lens 19 forms an image of the uniformly illuminated opening 13 in the plane of the horizontal slit 21. This image of opening 13 moves vertically across slit 21 when mirror 17 vibrates about the horizontal axis 18—18. As much of slit 21 as is illuminated by the image of opening 13, is imaged at recording point 27 by cylindrical lens 41. There thus is formed at recording point 27 a horizontal line image of the illuminated portion of slit 21, and this line image has sharp and distinct horizontal boundaries. Likewise in the vertical plane, spherical lens 12 forms an image of lamp filament 10 substantially on mirror 17, thereby filling mirror 17 with light and also aiding in the uniform illumination of opening 13 by lamp filament 10.

In the horizontal plane (Fig. 3), cylindrical lens 15 forms substantially on mirror 17 the intermediate image of opening 13, and an image of the intermediate image is formed by cylindrical lens 42 at position A. The image at position A, in its turn, is imaged at recording point 27 by spherical lens 43. By virtue of this successive imagery of opening 13 in the horizontal plane, the horizontal line image at recording point 27 has, in addition to its sharp and distinct horizontal boundaries, also sharply defined ends.

Lenses 12 and 19 are spherical and hence have power in the horizontal as well as in the vertical plane. But their actions in the horizontal plane can be disregarded for the following reasons:

On account of its position and relative focal length, spherical lens 12 tends to image lamp filament 10 substantially on mirror 17 also in the horizontal plane. The action, however, of cylindrical lens 15 interferes with this imagery to such an extent that it becomes immaterial for attaining the objects of the present invention. On the other hand, the power of spherical lens 19 in the horizontal plane has no effect upon the action of cylindrical lenses 15 and 42 on account of the proximity of spherical lens 19 to mirror 17 which is, in the horizontal plane, substantially at a common focus of cylindrical lenses 15 and 42. No actions, therefore, of spherical lenses 12 and 19 have been indicated in Fig. 3.

Lens 43 is likewise spherical and hence has power in the vertical as well as in the horizontal plane. But its action in the vertical plane is immaterial because, in this plane, its power is small compared to the power of cylindrical lens 41. No action, therefore, of spherical lens 43 has been indicated in Fig. 2.

Cylindrical lenses 15 and 42, in their turn, do not interfere with the imagery in the vertical plane since they have their cylinder axes vertical, and hence act in only the horizontal plane. Correspondingly, cylindrical lens 41 does not interfere with the imagery in the horizontal plane since it has its cylinder axis horizontal, and hence acts in only the vertical plane.

The imagery performed in the vertical and horizontal planes of the optical system of Figs. 1 to 3 thus brings it about that recording point 27 is conjugate to opening 13 in both co-ordinate planes. In the vertical plane, horizontal slit 21 is, with respect to spherical lens 19, conjugate to a horizontal line through opening 13, for example, the broken line $a$—$a$ shown in Fig. 4. Since, furthermore, recording point 27 is in the vertical plane conjugate to slit 21 with respect to cylindrical lens 41, it is also conjugate to line $a$—$a$. The line image at recording point 27 hence is an image of line $a$—$a$ as far as its vertical extension, or width, is concerned, and it is, according to a well known property of conjugates, made up of the light flux emanating from line $a$—$a$. Moreover, this light flux is brought to a focus at recording point 27 also in the horizontal plane, namely—as has been explained hereinabove—by the successive actions of cylindrical lenses 15 and 42 and of spherical lens 43. The line image at recording point 27 hence is an image of line $a$—$a$ also as far as its horizontal extension, or length, is concerned. When, therefore, the horizontal line through opening 13 is short—as is, for example, the broken line $b$—$b$ in Fig. 4—the line image is also short, while it is long when that horizontal line is long—as is, for example, the broken line $c$—$c$ in Fig. 4.

The particular horizontal line through opening 13 to which recording point 27 is conjugate, is determined by the angle of inclination of mirror 17. Normally, mirror 17 is adjusted so that at its rest position, that is, when no electrical impulses are applied to the oscillograph galvanometer on which it is mounted, recording point 27 is conjugate to line $a$—$a$, which line passes through opening 13 halfway between its tip and its base. When then the electrical impulses to be recorded are applied in known manner to the oscillograph galvanometer, mirror 17 vibrates in accordance therewith about the horizontal axis 18—18, and in such a manner that, when the amplitude of its vibration is a maximum, recording point 27 is conjugate to line $b$—$b$ at the one extreme of its motion and to the line $c$—$c$ at the other extreme thereof. The length of the line image at recording point 27 hence varies in accordance with the vibration of mirror 17 and, therefore, the electrical impulses to be recorded. A variable area track 28 thus is produced on film 23 as it moves past recording point 27.

As has been explained hereinabove, recording point 27 is conjugate to opening 13 or, more exactly, to a horizontal line through opening 13, in the horizontal as well as the vertical plane of the optical system of Figs. 1 to 3. The imagery, however, which results in this condition, is different in the two co-ordinate planes. In the vertical plane, opening 13 is imaged at slit 21 by spherical lens 19 which acts in the vertical plane, and slit 21 is imaged at recording point 27 by cylindrical lens 41 which acts in only the vertical plane. Since spherical lens 19 is placed in front of mirror 17 and images opening 13 immediately at slit 21, the light flux from opening 13 is—in the vertical plane—diffused at mirror 17. This is necessary because the vertical plane is the plane through which the light beam is deflected when mirror 17 vibrates about the horizontal axis 18—18, thereby selecting, in cooperation with the horizontal slit 21, horizontal lines through opening 13 which become conjugate to recording point 27.

In the horizontal plane, on the other hand, an intermediate image of opening 13 is formed substantially on mirror 17 by cylindrical lens 15, and this intermediate image is imaged at position A by cylindrical lens 42 and re-imaged at recording point 27 by spherical lens 43 which acts in the horizontal plane. Since cylindrical lenses 15 and 42 act in only the horizontal plane, mirror 17 is substantially at a common focus of two imaging means which act in only the plane containing its axis of vibration 18—18. For any given angle of inclination of mirror 17, therefore, the amount of light flux from opening 13 which is acted upon by cylindrical lens 42, is limited by the aperture of this lens rather than the aperture of mirror 17. Moreover, since the light flux acted upon by cylindrical lens 42 is brought to a focus at position A and thence focussed at recording point 27 by the action of spherical lens 43, the limiting aperture in the horizontal plane is not the actual aperture of cylindrical lens 42, but its apparent aperture as seen from recording point 27. The apparent aperture of cylindrical lens 42, however, may—in view of the action of spherical lens 43—be made at least twice as large as its actual aperture which, in its turn, may be made as much as five times as large as the aperture which it is practical to give to mirror 17. The limiting aperture in the horizontal plane of the optical system of Figs. 1 to 3 hence can easily be made at least ten times larger than the aperture of mirror 17.

The result thus obtained by means of the novel imagery embodied, by way of example, in the mirror oscillograph recording optical system of Figs. 1 to 3 represents a marked advance over the prior art. In the known optical systems, the light flux from the entrance position corresponding to opening 13 is diffused at the oscillograph mirror in the two co-ordinate planes so that the mirror aperture is the limiting aperture of the optical systems also in the co-ordinate plane which contains the mirror axis. Since the physical size of the oscillograph mirror must be comparatively small in order to avoid distortions due to its mass, the above condition has been a serious obstacle to an efficient utilization of the light flux in the prior art optical systems. The advantage gained in this respect by the imagery according to the invention is considerable because, as is well known to those skilled in the art, the efficiency with which the light flux from a given light source is utilized in an optical system, is approximately proportional to the product of the limiting apertures in the two co-ordinate planes of the optical system.

Another advantage of having, in the optical system of Figs. 1 to 3, mirror 17 substantially at a common focus of two imaging means which act in only the horizontal plane, is that small deviations of mirror 17 about a vertical axis have a negligible effect on the imagery in the horizontal plane. Mirror 17 need therefore be accurately adjusted only about the horizontal axis 18—18. This greatly increases the ease of adjustment of the optical system, and is particularly important when it is necessary to replace the oscillograph galvanometer on which mirror 17 is mounted.

A further advantage of the imagery performed in the optical system of Figs. 1 to 3 resides in the fact that there is formed substantially on mirror 17 an image of lamp filament 10 by the action of spherical lens 12 in the vertical plane, and simultaneously the intermediate image of opening 13 by the action of cylindrical lens 15 in the horizontal plane. It thus is possible so to control the light flux entering the optical system through opening 13 that it is all incident within the working aperture of mirror 17. This result is best obtained when the focal length of spherical lens 12 and the position of lamp 11 are chosen so that the image of lamp filament 10 has a vertical dimension no larger than that of mirror 17, and when the focal length of cylindrical lens 15 and the position of screen 14 are chosen so that the largest horizontal dimension of the intermediate image is no larger than the horizontal dimension of mirror 17. If these conditions are fulfilled, all the light flux passing through opening 13 is subject to control by mirror 17, whereby the formation of stray light in the optical system is reduced to a negligible amount.

The employment, finally, of cylindrical lens 41 in the portion of the optical system between screen 22 and recording point 27 has certain inherent advantages: Cylindrical lens 41 may have a short focal length so that the optical system may be built with small physical size. Moreover, a cylindrical lens of short focal length is less expensive than a spherical lens, or lens system, well enough corrected to form, over the same distance, an equally sharp line image. The optical system of Figs. 1 to 3 may hence be built with greater compactness and at less cost than the mirror oscillograph recording optical systems known heretofore.

The cost of building an optical system according to the invention may be further reduced by making the light beam defined by lamp filament 10 and opening 13 strike mirror 17 at a small angle. It then is possible to substitute a single. cylindrical lens 71 for the two cylindrical lenses 15 and 42 of Figs. 1 to 3. Like cylindrical lenses 15 and 42, cylindrical lens 71 has its cylinder axis vertical, and it is placed so as to be traversed by the reflected as well as the incident part of the light beam deflected by mirror 17. The relative focal length of cylindrical lens 71 is chosen so that opening 13 and a position on, or close to, mirror 17 are conjugate with respect to cylindrical lens 71 on the incident part, and this position and position A, or an equivalent position, are conjugate with respect to cylindrical lens 71 on the reflected part of the light beam. In this manner, cylindrical lens 71 forms the intermediate image of opening 13 substantially on mirror 17 and, simultaneously, images the intermediate image at a position other than the recording point 27.

One way of making the angle at which the light beam strikes mirror 17, sufficiently small consists in considerably lengthening the optical system mechanically. But, while such an arrangement materially reduces the cost of building the optical system on account of the replacement of two cylindrical lenses by a single cylindrical lens, it sacrifices the compactness of its mechanical structure. The latter disadvantage is overcome in, and a very compact mechanical design of the optical system is provided by, the arrangement shown in Fig. 5 by way of example. In this arrangement, a reflecting prism 70 is placed between screen 14 and mirror 17 whereby the incident part of the light beam is folded so that it strikes mirror 17 at a small angle, and cylindrical lens 71 is traversed by both the incident and reflected parts of the light beam. In place of prism 70 there may be employed other suitable beam folding means such as mirrors, or the like.

It has been pointed out hereinabove that, while spherical lens 43 has power in both the vertical and horizontal planes, its action in the vertical plane is immaterial. Spherical lens 43 may thus be replaced in the optical system of Fig. 5 as well as in that of Fig. 1 by a cylindrical lens 44, shown in Fig. 6, which has its cylinder axis vertical and hence acts in only the horizontal plane. Like spherical lens 43, cylindrical lens 44 is placed between screen 22 and recording point 27 and has one of its conjugate foci at position A, and the other at recording point 27. The effect of cylindrical lens 44 upon the imagery in the horizontal plane, therefore, is the same as that of spherical lens 43.

Figure 5:
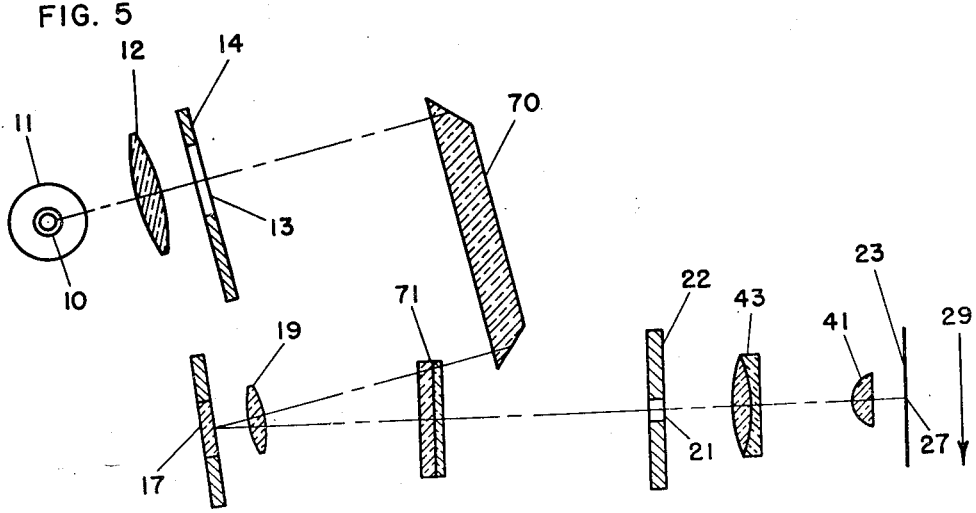

It, furthermore, will be understood by those skilled in the art that the optical system of Fig. 5 is susceptible also to most of the other modifications shown and described in Patent No. 2,437,470 with respect to the optical system of Fig. 1. For variable area recording, the various openings, or pairs of openings, shown in Figs. 5 to 10a of Patent No. 2,437,470 may be substituted for the opening in the screen 14 also in the optical system of Fig. 5 so as to form at screen 14— in conjunction with lamp filament 10 and condenser lens 12—a uniformly illuminated light spot whose horizontal extension varies in a vertical direction, or a pair of such light spots.

For variable density recording, there may be employed in the screen 14 a rectangular opening in conjunction with either a penumbra stop or a light shading member as shown in Figs. 11 and 12, respectively, of Patent No. 2,437,470. The light spot formed at screen 14 then is of uniform horizontal extension and vertically varying illumination, but the light flux emanating from it is vertically graded as in the case of the aforementioned openings whose horizontal extension varies in a vertical direction.

Moreover, also in the optical system of Fig. 5, spherical condenser lens 12 and spherical lens 19 may each be replaced by a cylindrical lens whose cylinder axis is horizontal, and which has the same focal length relative to the other parts of the optical system as the spherical lens it replaces; see Figs. 13 and 14 of Patent No. 2,437,470.

Finally, whenever the optical system of Fig. 5 is employed for variable area recording, cylindrical lens 71 should preferably be well corrected for spherical and chromatic aberration, and for coma, for the reasons set forth in Patent No. 2,437,470.

What is claimed is:

1. In an impulse recording optical system, the combination of light beam defining means which include means for forming a light spot of vertically graded light flux; a recording point past which a film may move in a substantially vertical direction; a mirror adapted to vibrate about a horizontal axis, said light beam being deflected by said mirror so as to have a part which is incident from said light spot upon said mirror, and a part which is reflected from said mirror towards said recording point; means placed between said mirror and said recording point, and forming a horizontal slit; a cylindrical lens placed between said light spot and said mirror and between said mirror and said slit forming means, said cylindrical lens having its cylinder axis vertical and being traversed by said incident and reflected parts; first imaging means placed in front of said mirror, and acting in the vertical plane; second imaging means placed between said slit forming means and said recording point, and acting in the horizontal plane; and third imaging means placed between said second imaging means and said recording point, and acting in only the vertical plane: said light spot and said mirror being conjugate with respect to said cylindrical lens on said incident part, said mirror and a position beyond said recording point being conjugate with respect to said cylindrical lens on said reflected part, said light spot and said slit being conjugate with respect to said first imaging means, said position and said recording point being conjugate with respect to said second imaging means, and said slit and said recording point being conjugate with respect to said third imaging means.

2. In an impulse recording optical system, the combination of light beam defining means which include means for forming a light spot of vertically graded light flux; a recording point past which a film may move in a substantially vertical direction; a mirror adapted to vibrate about a horizontal axis, said light beam being deflected by said mirror so as to have a part which is incident from said light spot upon said mirror, and a part which is reflected from said mirror towards said recording point; means placed between said light spot and said mirror for folding said incident part; means placed between said mirror and said recording point, and forming a horizontal slit; a cylindrical lens placed between said folding means and said mirror and between said mirror and said slit forming means, said cylindrical lens having its cylinder axis vertical and being traversed by said incident and reflected parts; first imaging means placed in front of said mirror, and acting in the vertical plane; second imaging means placed between said slit forming means and said recording point, and acting in the horizontal plane; and third imaging means placed between said second imaging means and said recording point, and acting in only the vertical plane: said light spot and said mirror being conjugate with respect to said cylindrical lens on said incident part, said mirror and a position beyond said recording point being conjugate with respect to said cylindrical lens on said reflected part, said light spot and said slit being conjugate with respect to said first imaging means, said position and said recording point being conjugate with respect to said second imaging means, and said slit and said recording point being conjugate with respect to said third imaging means.

3. The combination defined in claim 2, and wherein said second imaging means is a spherical lens.

4. The combination defined in claim 2, and wherein said second imaging means is a cylindrical lens having its cylinder axis vertical.

JOHN A. MAURER, JR.

REFERENCES CITED

The following references are of record in the file of this patent:

UNITED STATES PATENTS

| Number | Name | Date |
| --- | --- | --- |
| 2,157,166 | Dimmick | May 9, 1939 |
| 2,173,681 | Dimmick | Sept. 19, 1939 |
| 2,436,148 | Maurer | Feb. 17, 1948 |
| 2,437,470 | Maurer | Mar. 9, 1948 |